United States Patent Office 2,732,857
Patented Jan. 31, 1956

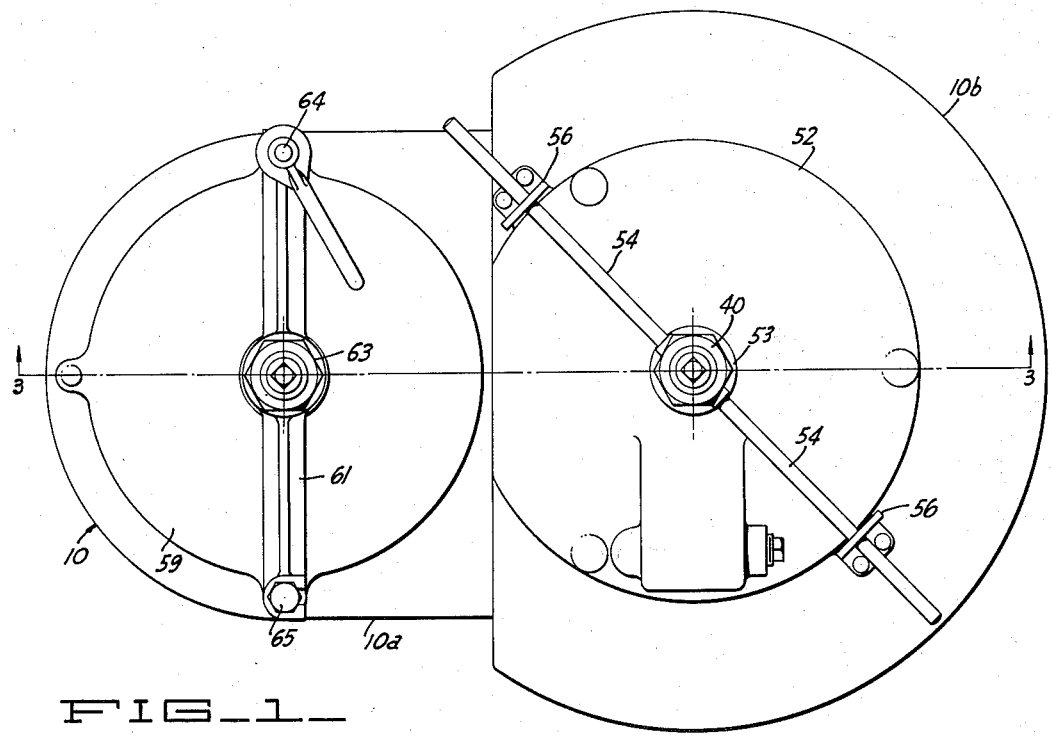
FIG_1_
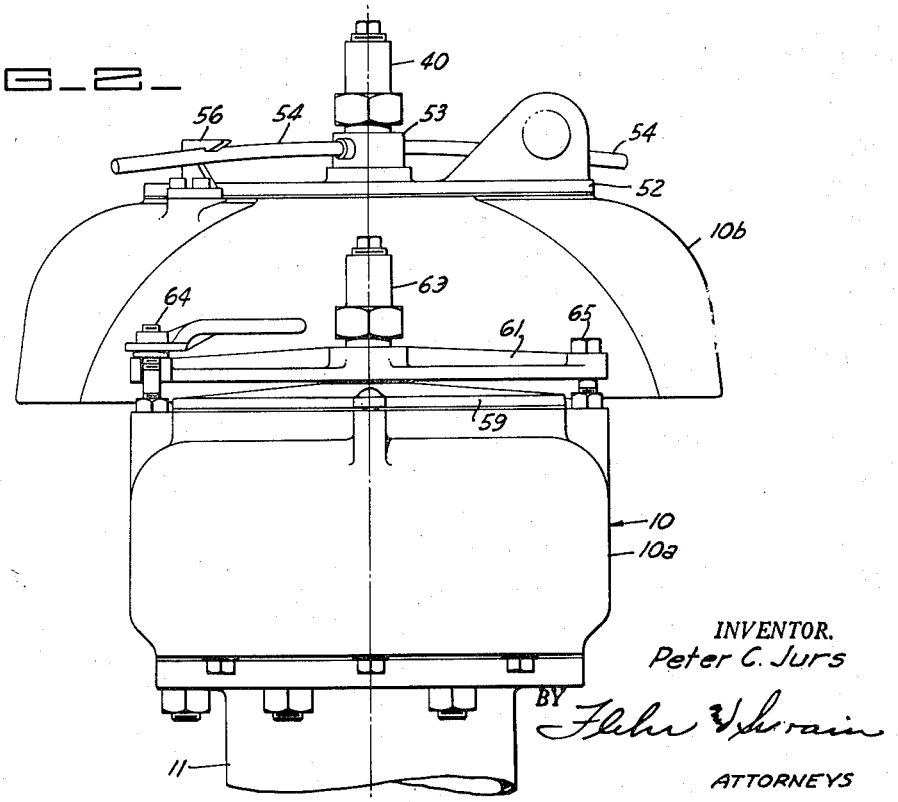
FIG_2_
INVENTOR.
Peter C. Jurs
BY
ATTORNEYS

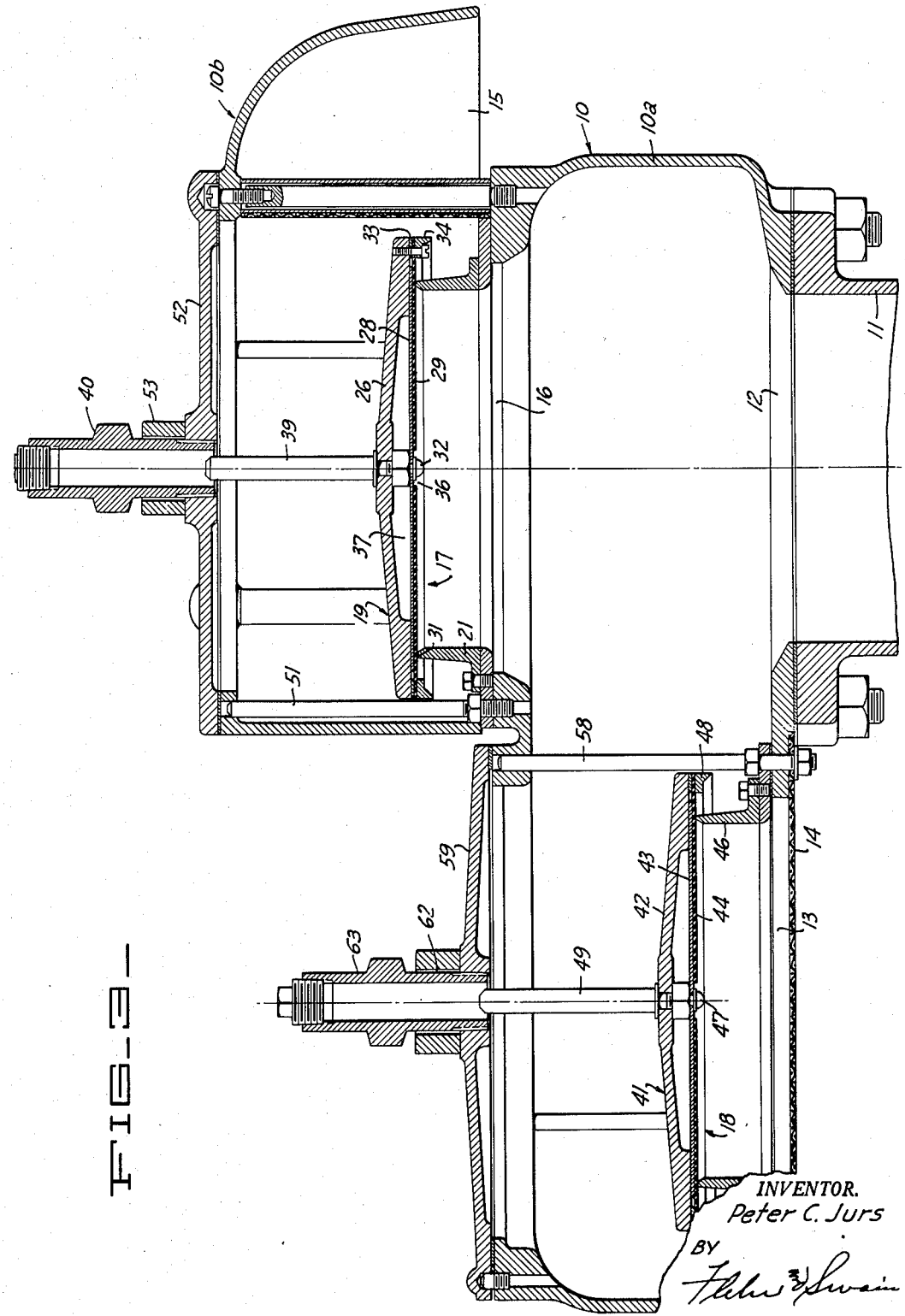

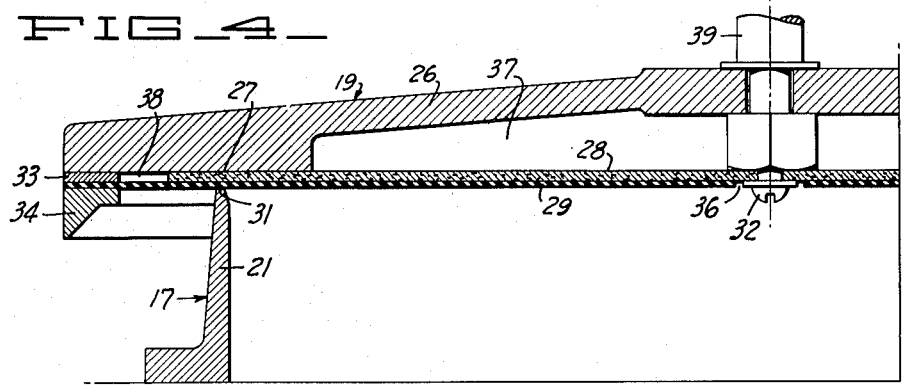
FIG. 4
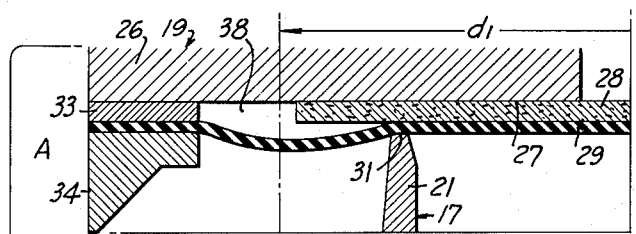
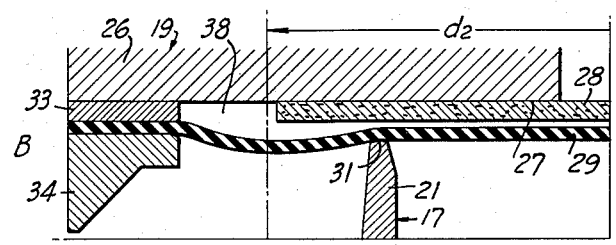
FIG. 5
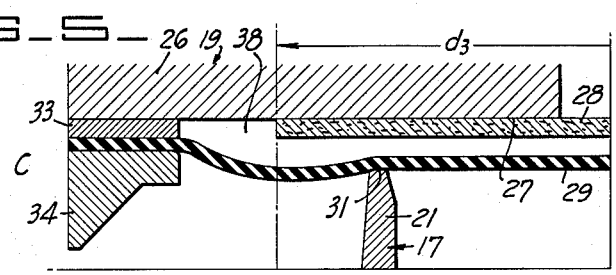
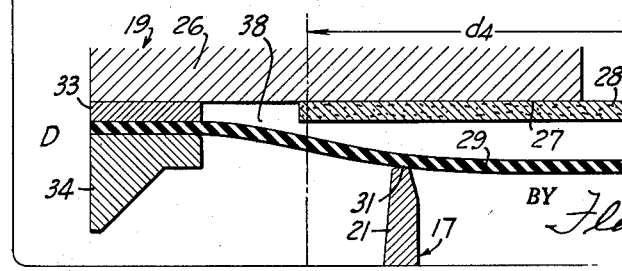
INVENTOR.
Peter C. Jurs
BY
ATTORNEYS Jan. 31, 1956 P. C. JURS 2,732,857
FLUID PRESSURE SEALED DIAPHRAGM RELIEF VALVE
Filed July 27, 1951 4 Sheets-Sheet 4
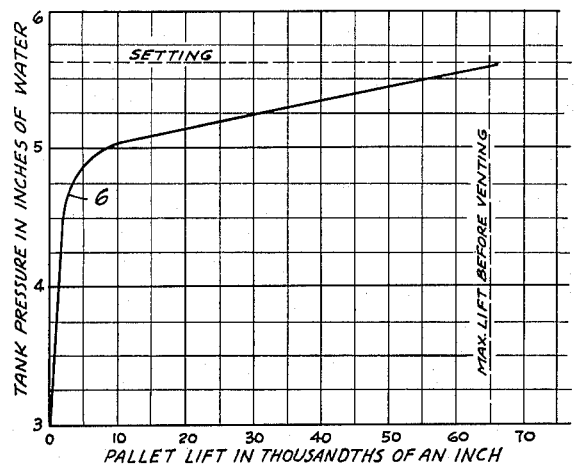
FIG_6_
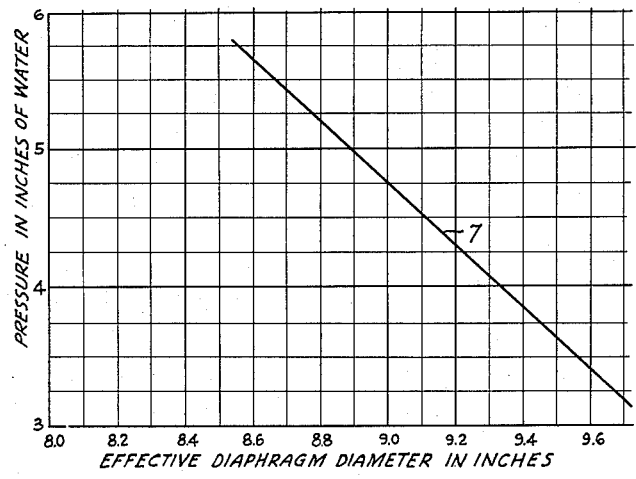
FIG_7_
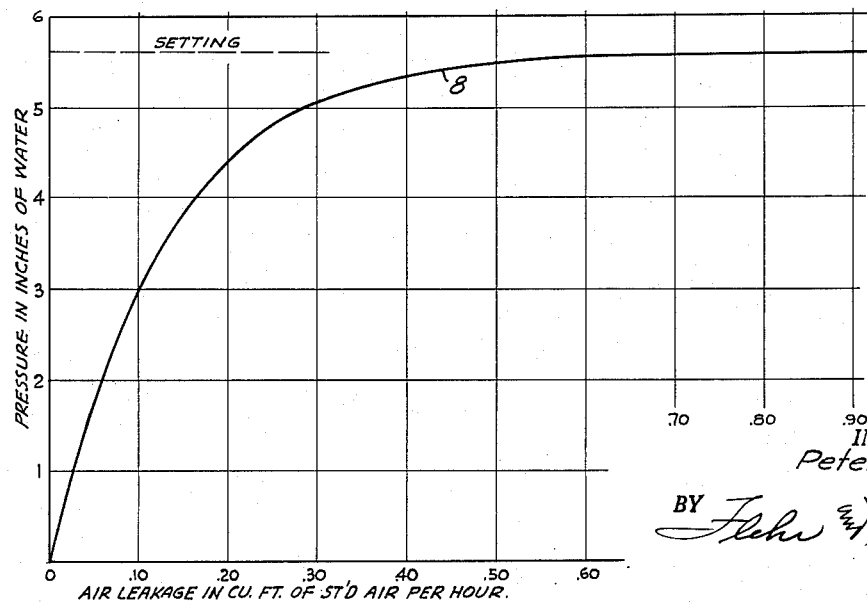
FIG_8_
INVENTOR.
Peter C. Jurs
BY
ATTORNEYS

2,732,857

FLUID PRESSURE SEALED DIAPHRAGM RELIEF VALVE

Peter C. Jurs, Oakland, Calif., assignor, by mesne assignments, to Shand and Jurs Company, Berkeley, Calif., a corporation of California Application July 27, 1951, Serial No. 238,839

4 Claims. (Cl. 137—494)

This invention relates generally to devices for controlling or regulating flow of various fluids.

In many industrial applications it is desirable to control flow of gases or vapors at relatively low pressures, with provision for relatively high permissible flow capacities. For example in the petroleum industry it is customary to protect storage tanks from the effects of excessive vapor pressure by the use of suitable pressure relief valves which are set to open at pressures of the order of 0.5 inch water pressure (water column) to 10 p. s. i. The relief valves adapted for such service must utilize a valve seat of relatively large diameter, together with a comparatively large valve member or pallet. Such valves may be weight or spring loaded, or loaded by use of gas under pressure which in turn is controlled by a pilot valve. In the commercial use of such equipment difficulty is experienced in maintaining a fluid tight seal upon the seat, particularly because the size of the parts makes it difficult to maintain uniform pressure between all parts of the valve sealing surfaces. Imperfections in manufacture or warpage of the parts after assembly tend to cause leakage and improper seating, even though one resorts to the use of resilient facing materials for the valve member or seat (see Jurs 2,214,963). It is particularly difficult to prevent leakage when the inlet pressure approaches the value for which the device is set to open, due to the small differential forces available to hold the valve member upon its seat. Leakage of hydrocarbon vapors or other inflammable gases from large storage tanks may create a serious fire hazard and in addition may result in considerable loss of valuable material. Mercury seals have been used to a limited extent (see Shand 1,897,076), but have been subject to serious objections, including difficulties involved in installation and maintenance.

It is an object of the present invention to provide an improved flow control device of the above character which is characterized in particular by its ability to maintain a good fluid tight seal.

A further object of the invention is to provide an improved device of the above character which can be successfully applied for control of relatively low vapor or gas pressures and where relatively high permissible flow capacities are desired.

Another object of the invention is to provide a flow control device of the above character which can be set to open at a given pressure, and which will remain relatively tight until the set pressure value has been reached.

Another object of the invention is to provide a flow control device of the above character having a novel balancing action for a substantial range of pressures below that for which the device is set to open.

Further objects and features of the invention will appear from the following description in which the preferred embodiments have been set forth in detail in conjunction with the accompanying drawing.

Referring to the drawing:

Figure 1 is a plan view showing a combined pressure and vacuum relief valve incorporating features of the present invention.

Figure 2 is an end view of the apparatus shown in Figure 1.

Figure 3 is a cross-sectional view on an enlarged scale taken along the line 3—3 of Figure 1.

Figure 4 is an enlarged cross-sectional view of the valve device.

Figure 5 consists of a group of diagrammatic cross-sectional details serving to illustrate the mode of operation of one of the valve devices.

Figures 6, 7 and 8 are curves serving to illustrate the performance of one of the valve devices.

The apparatus illustrated in Figures 1 to 3 of the drawing consists of a housing 10 that is adapted to be connected to an associated pipe 11. In a typical installation this pipe connects with the upper part of a storage tank containing gasoline or other volatile hydrocarbon. The main section 10a of the housing has an opening or passage 12 for communicating with the pipe 11, and an opening or passage 13 that is covered by a screen 14, and which communicates with the atmosphere. Also it has an opening or passage 16 which communicates with the upper housing section 10b. This upper housing section is in free communication with the atmosphere through the screened opening 15. Flow through the opening 16 is controlled by pressure relief valve means designated generally by number 17, and flow through the opening 13 is controlled by vacuum relief valve means designated generally by number 18.

The pressure relief valve means 17 consists of a pallet assembly 19, together with a stationary seat ring 21. The pallet assembly (Figure 4) consists of a member 26 in the form of a relatively flat disc-like pallet made of suitable metal or like rigid material. It is constructed to a diameter considerably greater than that of the seat ring 21, whereby an outer margin extends for a substantial distance outwardly from the seat. The lower face of the disc 26 is machined to provide the flat annular face 27, and the members 28 and 29 extend between this face and the valve-working surface 31 of the seat 21.

Member 28 serves as a cushion, and is in the form of a pliable disc formed of suitable resilient material, such as cork impregnated with a resilient synthetic material like Neoprene. Its central portion is shown attached to the disc 26 by a screw 32 or like means, and its peripheral margin is free from attachment and is loosely retained between the annular face 27 and member 29.

Member 29 is in the form of a pliable diaphragm made of suitable resilient material, such as fabric reinforced synthetic rubber. Its outer peripheral edge portion is clamped to and sealed with respect to the outer periphery of the disc 26 in a region spaced outwardly from the seat. The means illustrated for this purpose includes the spacer and clamping rings 33 and 34 which are clamped together and to the periphery of the disc 26 by screws or like means. The diaphragm member 29 extends inwardly over the lower face of the member 28, and its central portion is shown provided with an opening 36 to accommodate the screw 32. The space 37 which is shown overlying the member 28, is in substantially unrestricted communication through the opening 36 with the space below the diaphragm member 29 (i. e. the space surrounded by the seat ring 21). Space 37 is also in substantially unrestricted communication through the opening 36 with the space 38 which extends outwardly beyond the seating surface 31, above the diaphragm member 29. As will be presently explained the diaphragm is free to be ballooned downwardly to a limited extent by applied fluid pressure. Ring 34 preferably extends for a substantial distance below the diaphragm, and it has a conical shaped inner periphery whereby when gas or vapor vents laterally from the seat ring, as the valve member moves to venting position, it is deflected downwardly by the ring 34 to provide an upward force component serving to move the valve member to full open position with snap action.

A vertical stem 39 is shown secured to the pallet disc 26 and is loosely guided within the fitting 40.

The vacuum relief valve means 18 can be formed in substantially the same manner as the pressure relief valve means. Thus the pallet assembly 41 includes the rigid pallet disc 42, together with the pliable members 43 and 44, corresponding to the above described members 28 and 29. This pallet assembly cooperates with the seat ring 46, which is mounted directly above the opening 13. The central portion of member 43 is secured to the pallet disc 42 by a screw 47, and the outer periphery of the member 44 is secured to the outer periphery of the disc by the clamping ring 48. A guide stem 49 extends vertically from the disc 42, and is adapted to be loosely guided within the fitting 63.

The details of construction of the housing 10 may vary in different instances. In the construction illustrated a plurality of vertically extending rods 51 are mounted within the housing and spaced circumferentially about the periphery of the pallet disc 26. These rods serve to retain the disc generally centralized with respect to the seat ring 21.

The housing cover 52 is shown held in place by suitable clamping means. Thus a collar 53 is loosely disposed about the fitting 40, and carries the radially extending rods 54. These rods are adapted to be latched in engagement with the hooklike retainers 56, which are carried by the housing. When the rods 54 are sprung and manually disengaged from the retainers 56 the cover 52 can be readily removed for servicing or replacement of the valve means 19.

The vacuum relief pallet 42 is likewise generally centered and loosely guided by the vertical rods 58. The cover 59 for this portion of the housing is shown releasably clamped in closed position by the clamping bar 61, which has a central opening 62 to accommodate the fitting 63, and which has slotted ends to accommodate the clamping screws 64 and 65.

As described above the two pallet assemblies are weight loaded. As is well known to those familiar with the operation of pressure and vacuum relief valves, weight loading can be adjusted by varying the weight of the moving parts at the time of manufacture, or by the addition or removal of loading weights. Such weights can be in the form of discs adapted to rest upon the pallets and apertured to accommodate the stems 39 and 49.

Operation of the device described above is as follows: When the pressure applied to the lower side of the pallet assembly 19 reaches a predetermined value for which the valve is set to open, this assembly moves upwardly from the seat 21 to permit free venting of gas through the opening 17. When the pressure in the tank is reduced to a predetermined level, the pallet assembly again returns to sealing engagement with the seat. When a condition of subatmospheric pressure exists in the tank, a differential pressure is applied to the pallet assembly 41 tending to lift the same from the seat 46. When the subatmospheric pressure or partial vacuum reaches a predetermined value, the lifting force is sufficient to raise the pallet assembly 41 from the seat 46, thus permitting atmospheric air to flow into the tank. When normal conditions are established the pallet assembly 41 returns automatically to closed position.

While the above reviews the general mode of operation, it does not explain the way in which each of the two pallet assemblies maintains a highly effective seal with respect to its stationary seat, until opened by application of a predetermined pressure differential. This feature can be best explained by reference to Figure 5. Referring particularly to the pressure relief pallet assembly 19, when the pressure in the passage 12 is well below the maximum pressure for which the device is set to operate, the pallet assembly will occupy a position relative to the seat ring substantially as shown in Figure 5A. The pliable diaphragm-like member 29 contacts and seals upon the stationary seating surface 31, and the member 28 forms a resilient cushion which is interposed between the member 29 and the face 27. Under such conditions the differential pressure acting upwardly upon the pallet is either negligible or relatively low, and therefore there is little tendency for leakage. However the cushioning member 28 aids in securing relatively even distribution of pressure between the diaphragm member 29 and the valve working surface 31. Should a condition of subatmospheric pressure occur in the storage tank, differential force acts downwardly upon the pallet assembly 19, thus causing greater pressure to be applied between the diaphragm member 29 and the working surface 31. Here again the cushioning member 38 functions to obtain relatively uniform distribution of pressure to thereby tend to prevent leakage under such conditions.

Assuming that the tank pressure is slightly greater than atmospheric, such pressure is applied to space 38, or in other words, to the upper face of that portion of the pliable diaphragm member 29 extending between the valve working surface 31 and the clamping ring 34. The portion of the diaphragm member just mentioned can be referred to as the free portion which extends outwardly beyond the seat ring. The mean effective diameter of this free diaphragm portion has been indicated in Figure 5A as $d_1$. It will be evident that any storage tank pressure greater than atmospheric will create a differential force acting downwardly upon this free diaphragm portion, thus tending to bulge the same downwardly. Under the pressure conditions assumed for Figure 1A the downwardly bulged diaphragm portion aids in maintaining a fluid tight seal with the seating surface 31, and the effectiveness of the sealing contact is not dependent upon the softness of the diaphragm and the cushioning member 28.

Figure 5B illustrates the conditioning of the parts when the storage tank pressure is increased to a value sufficient to cause the pallet assembly to assume what I refer to as a free floating condition. The pallet disc has been lifted a slight amount so that a small clearance exists between members 28 and 29, in the region of the valve seating surface 31. The free diaphragm portion is shown being bulged downwardly by application of tank pressure to its upper side, and this downward force serves to urge the diaphragm member into sealing engagement with the valve seating surface. The downward pressure is uniform throughout the entire circumference of the valve seating surface, particularly because it is completely independent of the pallet disc 26, or the cushioning member 28. It will be evident that the clearance just mentioned between the members 28 and 29, in the region of the valve working surface 31, may exist between member 28 and the flat disc surface 27, depending upon whether or not the cushioning member 28 has sufficient stiffness to retain the same in contact with the face 27.

The elevation of the pallet disc illustrated in Figure 5B is such that an equilibrium or balance is automatically established for the particular differential pressure being applied. Equilibrium is established by an automatic change in the mean effective diameter of the free diaphragm portion, due to the change in the relative position between the valve working surface 31, and the point of attachment of the diaphragm member established by the clamping ring 34. This shift results in a slight reduction in the mean effective diameter of the free diaphragm portion, as indicated by the new mean diameter $d_2$.

The positioning of the parts for a further increase in storage tank pressure is shown in Figure 5C. The pallet disc has been raised to a higher position, and concurrently with this new positioning of the pallet disc, the mean effective diameter $d_3$ has been reduced from the diameter illustrated in Figure 5B. Here again an effective seal is being maintained between the diaphragm member and the valve seating surface 31, although the downward pressure of the diaphragm member against the valve working surface 31 is slightly less than for the position illustrated in Figure 5B.

Assuming now that the tank pressure increases to the value for which the device is set to open, the resulting positioning of the parts is illustrated in Figure 5D. The mean effective diameter of the free diaphragm portion has been reduced to $d_4$, and remains at this minimum value as the pallet may be further elevated from the seat by inlet pressure, since the diaphragm is now taut and is not free to balloon to any further extent.

Further upward movement from the position of Figure 5, due to a higher tank pressure, causes the valve member to move to full open position with snap action, thereby venting off gas or vapor to cause the tank pressure to reduce. Such snap action occurs because of the shaping and proportioning of the member 34, whereby it forms a lip for deflecting flow of gas or vapor in a general downward direction.

When normal conditions are restored, and the storage tank pressure drops to a predetermined value below that for which the device was set to open, the pallet assembly again moves downwardly to closed position with the diaphragm member 29 reestablishing engagement with the valve working surface 31.

Figures 6, 7 and 8 illustrate performance curves which were made in the testing of a particular pressure relief valve. In this instance the valve working surface 31 had a mean effective diameter of about eight and one-half inches, and the clamping ring 34 had an inner diameter of nine and seven-eighths inches. This provided a free diaphragm portion having an effective radial width of about $11/16$ inch.

The curve 6 illustrated in Figure 6 illustrates the lift of the pallet (while maintaining sealed relation with the seat) over a substantial range of tank pressures below that for which the device was set to open. It will be noted that the curve rises quite rapidly for relatively low pressures, and then rapidly changes its slope as the tank pressure approaches that for which the device is set to open. In the particular curve illustrated the major part of the pallet lift occurs within a range of tank pressures from about 5 to 5.5 inches of water, with the pallet being loaded to open at a pressure of about 5.6 inches of water. Although the greater portion of the lift occurs between the pressure range of about 5 to 5.5 inches of water, the lift actually commences at a pressure of about 3 inches of water.

For the particular equipment and test referred to above, calculations were made with respect to the change in effective mean diameter of the free diaphragm portion, for different positions of the pallet. The result of these calculations is shown in curve 7. Note that this curve is a straight line, and that there is an inverse relation between storage tank pressure and the mean effective diameter.

Certain inherent characteristics of the device will be apparent from Figures 5, 6 and 7. For a substantial range of pressures below the pressure value for which the device is set to open, the pallet assumes a condition of balance in which the resilient diaphragm member 29 is pressed upon the seating surface 31 purely by pneumatic pressure. Because of the change in the mean effective diameter of the free diaphragm portion which extends outwardly beyond the seat, the pallet assumes a balanced position corresponding to the particular pressure value, and the pallet rises in response to an increase in the applied pressure differential. Referring to the specific example previously mentioned, the lift of the pallet is almost negligible until a pressure is reached of about five inches of water. At about five inches of water pressure, a transition occurs and thereafter the pallet lift rate with respect to unit pressure increases until a constant rate is maintained as indicated by the upper straight line portion of the curve of Figure 6. This transition zone is attributed to the cushioning effect of member 28 and the resilient character of member 29. For the lower pressures up to the transition zone the lift of the pallet 26 is accommodated by expansion of the partially compressed portions of members 28 and 29 which overlie the seating surface 31. Thereafter the pallet member 26 floats free of the seat and the relationship between further pressure increases and pallet rise is represented by the upper straight line portion of the curve.

In addition to the floating action previously described, and the manner in which the device automatically establishes a condition of equilibrium for different applied differential pressures, the device establishes a balanced condition tending to prevent cocking of the pallet from its horizontal position. In other words while the pallet is in free floating condition, with the diaphragm member being pneumatically pressed upon the valve seating surface 31, inherent balancing forces tend to automatically maintain the pallet disc in horizontal position, although this disc is only loosely retained by the guide means previously described. Such inherent stability is desirable in that it makes for uniform distribution of pressure between the diaphragm member and the valve seating surface, whereby when the pressure is reached for which the device is set to open, there is a relatively sharp transition from sealed to open position over the entire length of the seating surface. This inherent stability against cocking action is attributed to the fact that when the pallet disc tends to cock in one direction, the mean effective diameter upon the low side tends to be slightly greater than on the high side, with the result that a force couple is created tending to restore the pallet to true horizontal position.

The curves of Figure 7 serve to illustrate the effectiveness of my device when incorporated in a pressure relief valve which is loaded to open at a pressure of about 5.6 inches of water pressure. For pressures up to about 5.5 inches of water, the leakage remained relatively negligible. Leakage at this point was far less than with a standard type of pressure relief valve having a simple resilient facing for the pallet. As the pressure was increased beyond the value for which the device was set to open, the flow through the device increased rapidly. It will be noted that the curve has a well defined knee or transition zone over the pressure range of from about 4.5 to 5.5 inches of water. As previously pointed out, for this pressure range the space 38 over the free portion of the diaphragm member 29 has become completely pressurized, and the pallet has free floating action.

The foregoing explanation concerning operation of the device is directed towards the pressure relief means 17, rather than the vacuum relief means 18. However the pallet for the vacuum relief means is constructed in the same manner as previously explained, and the operation is inherently the same as for the pressure relief means. When a condition of partial vacuum or subatmospheric pressure exists in the storage tank, the pressure upon the upper side of the pallet assembly 41 is reduced, and therefore a differential pressure tends to force the pallet upwardly. This pallet assembly is likewise loaded to open when a particular subatmospheric pressure has been reached, and over a substantial range of pressures prior to reaching the pressure for which the device is set to open, the pallet has free floating action.

It will be evident from the foregoing that my invention is capable of wide usefulness. In addition to its application to relieving excessive pressure or vacuum conditions in storage tanks, it can be employed in connection with pressure reducing regulators, or so-called back pressure regulators. Also it can be employed in conjunction with pilot valves, as for example in the manner disclosed in Patent No. 2,214,963.

Although the invention has been disclosed as particularly applicable for relatively low pressures, it can be utilized for pressures considerably greater than the pressure ranges indicated by way of example, in the foregoing description.

This application is a continuation-in-part of my copending application Serial No. 632,145, filed December 1, 1945, for Fluid Flow Control Device.

I claim:

1. In a fluid flow control device, a body having inlet and outlet passages, an annular seat formed within the body and surrounding an opening which connects the inlet and outlet passages, the said seat providing an annular valve working surface located in a horizontal plane, a rigid valve pallet disposed within the body above the seat and movable in a vertical direction between full open and closed positions relative to the same, said valve pallet being yieldably urged by its effective weight downwardly toward the seat, fluid pressure applied to the lower side of the valve pallet serving to displace the pallet upwardly relative to the seat, a flexible diaphragm member of pliable material extending over the lower face of the pallet and interposed between the pallet and the seat, means forming a firm sealed attachment between the outer peripheral portion of the diaphragm and the outer periphery of the valve pallet, the region of attachment being spaced outwardly from the valve working surface of the seat, thereby providing a flexible annular diaphragm portion extending in a general horizontal direction and which is exposed on its lower side to the outlet pressure, the diaphragm member having freedom of flexing movement for a substantial distance toward and away from the lower side of the valve pallet, means connecting the space between the diaphragm member and the pallet with the inlet passage whereby inlet pressure tends to urge the diaphragm member against the valve working surface, said flexible annular diaphragm portion being bulged downwardly by inlet pressure applied to said space, applied inlet pressure for a range below the pressure for which the device is set to open serving to elevate the valve pallet to a position in which the same is free floating with respect to the valve seat, the lower side of the pallet being formed to provide an annular surface which overlies the portion of the diaphragm that contacts the valve working surface of the seat, said annular surface and said diaphragm portion serving as the sole means to support the effective weight of the pallet for inlet pressures below said range whereby for such pressures the diaphragm is pressed into sealing engagement with the seat.

2. A valve as in claim 1 in which a separate layer of cushioning material is interposed between that portion of the diaphragm which engages the seat and said annular surface of the pallet.

3. In a fluid flow control device, a body having inlet and outlet passages, and an annular seat formed within the body and surrounding an opening which connects the inlet and outlet passages, said seat providing an annular valve working surface located in a horizontal plane, a rigid valve pallet disposed within the body above the seat and movable in a vertical direction between full open and closed positions relative to the seat, said valve pallet having an effective loading weight serving to yieldably urge the same downwardly toward the seat, fluid differential pressure applied to the valve pallet from the inlet side of the seat serving to displace the valve pallet relative to the seat, a substantially unbiased flexible diaphragm member of pliable material extending over the lower side of the pallet and interposed between the pallet and the seat, means forming a sealed attachment between the outer peripheral portion of the diaphragm and the outer periphery of the valve pallet, said diaphragm providing a flexible annular diaphragm portion extending in a general horizontal direction beyond said valve seat and which is exposed on its lower side to outlet pressure, the diaphragm member having substantially unbiased freedom of movement for a substantial distance toward and away from the lower side of the valve pallet, means connecting the space between the diaphragm member and the pallet with the inlet passage whereby inlet pressure tends to urge the diaphragm member against the valve working surface, said flexible annular diaphragm portion being bulged downwardly by inlet pressure applied in said space, applied inlet pressure in a range approaching the pressure at which the device is set to open serving to elevate the valve pallet to a balanced position in which the same is free floating with respect to the valve seat, the lower side of the pallet being formed to provide an annular surface which overlies the portion of the diaphragm that contacts the valve working surface of the seat, said annular surface and said diaphragm portion serving as the sole means to support the effective weight of the pallet for inlet pressures below said range whereby for such pressures the diaphragm is pressed into sealing engagement wtih the seat.

4. A valve as in claim 3 in which a separate layer of cushioning material is interposed between that portion of the diaphragm which engages the seat and said annular surface of the pallet.

References Cited in the file of this patent

UNITED STATES PATENTS

| 1,620,719 | Buck | Mar. 15, 1927 |
| 1,697,516 | Hele-Shaw | Jan. 1, 1929 |
| 1,869,204 | Lowe | July 26, 1932 |
| 2,101,991 | Finley | Dec. 14, 1937 |
| 2,317,923 | Lebo | Apr. 27, 1943 |
| 2,377,947 | Lewis | June 12, 1945 |